United States Patent [19]

Kim et al.

[11] 4,183,047
[45] Jan. 8, 1980

[54] CHROMA LEVEL STABILIZER

[75] Inventors: Seung K. Kim; John F. Shouse, Jr., both of Portsmouth, Va.

[73] Assignee: General Electric Company, Portsmouth, Va.

[21] Appl. No.: 858,602

[22] Filed: Dec. 8, 1977

[51] Int. Cl.² ............................................. H04N 9/535
[52] U.S. Cl. ............................................................ 358/27
[58] Field of Search ..................................... 358/27–29

[56] References Cited

U.S. PATENT DOCUMENTS

| 3,943,560 | 3/1976 | Freestone | 358/27 |
| 3,968,516 | 7/1976 | Santo et al. | 358/27 |
| 4,059,838 | 11/1977 | Banker et al. | 358/27 |

*Primary Examiner*—John C. Martin

[57] ABSTRACT

A chroma level control circuit for a television receiver is responsive to the average of selected portions of color difference signals to reduce deviations from a viewer-selected chroma level. The preferred chromal level is selected by the viewer and the automatic control circuit responds to amplitude variations in selected portions of the color difference signals to stabilize chroma level about the preferred level. A gating circuit is responsive to the demodulated color difference signals and selective of portions thereof, e.g. the positive portion of the R-Y signal, so that only selected hues are used to automatically control the chroma level by adjustment of the receiver's chroma gain controlled amplifier. The circuit is also responsive to low brightness levels in the scene to temporize chroma level control during low brightness scenes. In addition, the chroma level control circuit is frequency selective, i.e. long duration highly saturated scenes, such as a bright red background, will not be fully responded to as an undesired phenomenon requiring lowering of chroma level.

18 Claims, 5 Drawing Figures

CHROMA LEVEL STABILIZER

BACKGROUND OF THE INVENTION

The present invention pertains to automatic chroma level (saturation) control circuitry for a color television receiver and, more particularly, to a circuit for automatically controlling chroma gain to stabilize chroma level about a viewer-selected chroma level.

Incorrect color level can result in a television receiver due to errors in generation of the video in the studio and from transmission, and reception errors. Color level errors can cause color in the television display to appear either washed out or oversaturated. These errors may be particularly apparent between different channels or as a result of shifts from one type of program material to another (such as occurs during commercial interruptions) or as a result of shifts from one video camera to another at the studio.

A conventional type of automatic chroma control (ACC) system for television senses the magnitude of the received color burst signal and varies chroma gain to maintain a substantially constant burst level. This system assures a stable color level so long as the correct relationship is maintained between the burst signal and the chroma portion of the video signal and so long as system errors affect the burst and chroma signal equally. However, when the burst to chroma signal ratio is not maintained or if system errors occur which affect the burst and chroma signals unequally, operation of the automatic chroma control circuits may distort chroma saturation levels and noticeably degrade picture quality.

Errors in chroma level in the receiver, due either to generation, transmission or reception errors, or due to overcompensation by the ACC have been dealt with in the past by control circuits, commonly referred to as chroma averaging circuits. Such chroma averaging circuits are responsive to chroma amplitude changes in general to adjust chroma gain. In particular, these circuits are not selective of a particular range of hues and are not sensitive to particular brightness levels in the scene. Because of this lack of hue selectivity, such chroma averaging circuits can produce undersirably washed out pictures. For example, in the case of a high level green background as in a golf scene, the circuits will respond to reduce the overall chroma level so that any flesh tones within the scene are improperly reduced in level. This is particularly annoying since fleshtones, the known quantity to the viewer, are the predominant hues by which the viewer judges the quality of the color picture. Likewise, when chroma averaging circuits are not sensitive to the brightness level of the scene, in the presence of low brightness scenes where the chroma level is desirably low, such circuits will cause the chroma level to rise undesirably.

OBJECTS AND SUMMARY OF THE INVENTION

It is therefore an object of the present invention to provide an improved automatic chroma control for a color television receiver operative within a predetermined range of hues to limit chroma level deviation from the preferred level selected by the viewer.

Another object of the present invention is to provide a chroma averaging circuit responsive only to portions of selected color difference signals.

Another object of the present invention is to provide a chroma averaging circuit that is responsive to scene brightness as well as to selected portions of color difference signals to control chroma level.

A further object of the present invention is to provide a chroma averaging circuit that is frequency sensitive, i.e. selectively responsive to the duty cycle of chroma information.

These and other objects are generally realized in the chroma control system of the invention which comprises a first control circuit including manual adjustment means for enabling an operator (preferably the viewer, but could include factory or service adjustment) to set the gain of the chroma amplifier of the receiver to a level producing preferred displayed video image chroma level, and a second control circuit supplying a chroma control output signal for modifying the manually set preferred chroma gain in accordance with deviations in the magnitude of selected portions of the color difference signals, i.e. the positive portion of the R-Y and B-Y color difference signals.

In greater particularity, the chroma level control system of the present invention includes within the second control circuit gating circuit means responsive to the demodulated color difference signals and to a reference signal during no chroma time to provide an output signal derived from selected positive portions of the color difference signals. The output signal of the gating circuit is applied by the second control circuit to the first control circuit after being amplified by a frequency selective amplifier. The frequency selective amplifier is less responsive to long duty cycle signals so that a predominant red background, for example, will not be fully responded to, so that such a high chroma level scene will not cause the chroma gain to be lowered substantially. The frequency selective amplifier of the second control circuit also inverts the gate output signal so that the chroma control output signal from the first control circuit is modified by an inverse function of color difference signal amplitude, i.e. the higher the amplitude of the color difference signals the lower the amplitude of the chroma control output signal.

The first control circuit receives the output signal from the second control circuit, integrates it so as to obtain the average of the chroma content of the selected portions of the color difference signals and then combines this average signal with the chroma level signal provided by the manual chroma level setting means. Thus, once the preferred chroma level is set by the viewer, the automatic chroma level control system responds to certain deviations from the preferred chroma level in selected portions of color difference signals and acts to reduce such deviations.

There is further provided brightness sensing means for sensing the average brightness level of displayed video images. The brightness sensing means is included within a brightness control circuit that couples a brightness control signal to the first control circuit to modify the chroma control output signal so that when the average brightness level of displayed images drop below a predetermined level, the gain of the chroma amplifier is limited in rising in response to the decrease in average chroma content of low brightness images.

BRIEF DESCRIPTION OF THE DRAWING

The objects, features and advantages of the present invention may be more fully understood by the following detailed description and the drawings, in which.

DETAILED DESCRIPTION OF PREFERRED EMBODIMENTS

Figure 1:
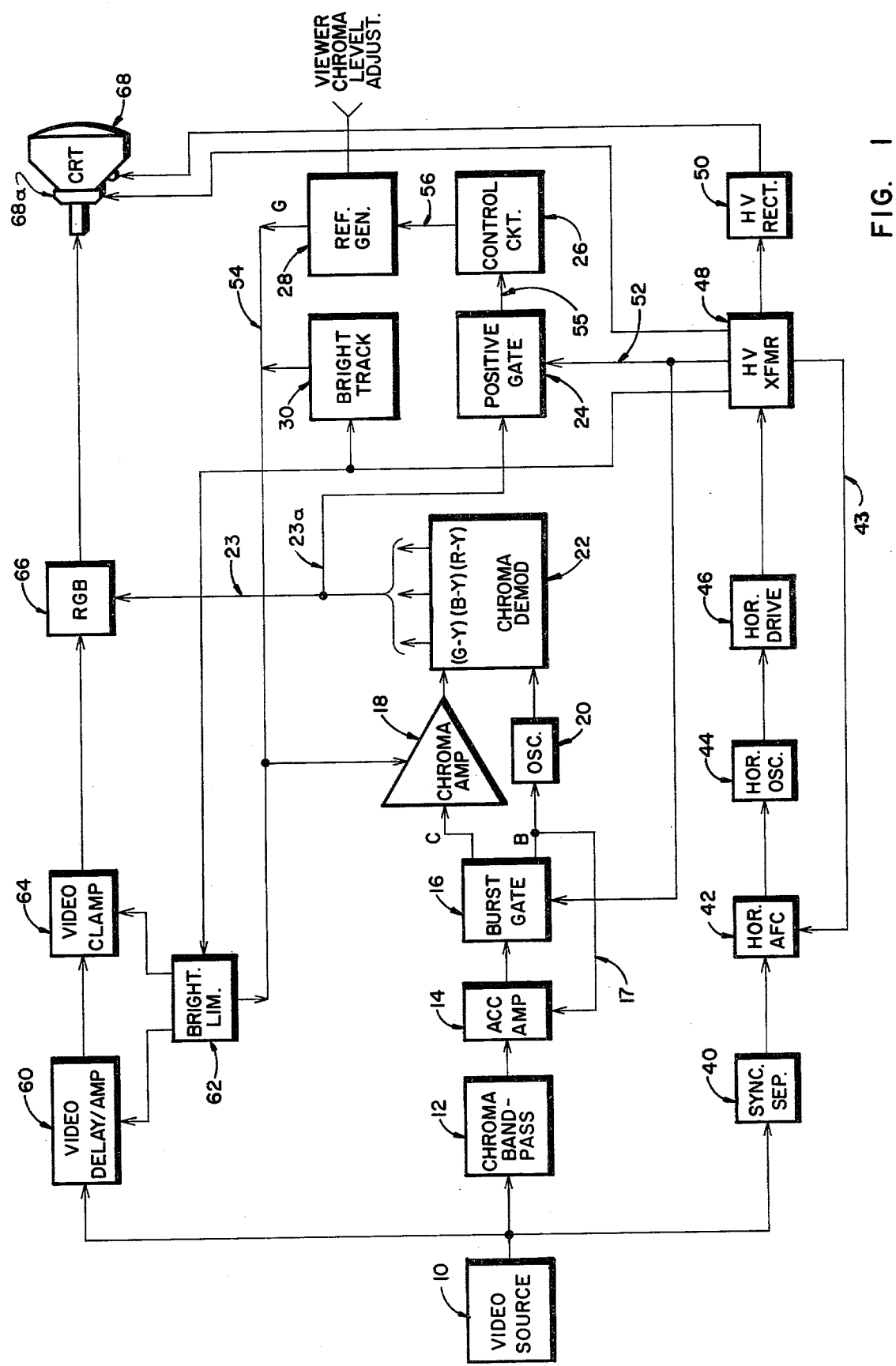
FIG. 1 is a schematic block diagram of portions of the video processing system of a color television receiver employing the automatic chroma level control system of the present invention.

Referring to FIG. 1, the basic video, chroma and sweep portions of a color television receiver are shown including a video source 10, such as a suitable video detector, which provides a video signal. This signal is fed simultaneously to the three principal video processing sections of the receiver, i.e. the sweep circuits, the chrominance circuits, and the luminance circuits.

The sweep circuits include a sync separator 40 which generates pulses in response to line and field sync information embodied in the video signal. These sync pulses control the horizontal AFC circuit 42 to maintain synchronization of the horizontal oscillator 44 and horizontal sweep system comprising drive circuit 46 and high voltage transformer 48. Horizontal AFC circuit 42 is also responsive to horizontal flyback pulses from high voltage transformer 48 via lead 43, the AFC circuit thereby adjusting the timing of the flyback pulses in accordance with the sync pulses. The horizontal sweep system provides anode high voltage for cathode ray tube 68, drive current for the beam deflection yoke 68a and may provide timing and control pulses for the chrominance luminance circuits, to be described.

The luminance circuits process the video signal through a video delay line and amplifier 60 and video clamp 64. The latter circuit restores the absolute brightness level of the luminance signal and supplies it to the RGB amplifier 66. The luminance signal from clamp circuit 64 and the color difference output signals from chroma demodulator 22 are matrixed in RGB amplifier 66 for application of the red, green and blue signals to the cathode ray tube 68. These circuits are all well known to those familiar with conventional color television receivers. As is also well known, other techniques are available for applying the luminance and color difference signals directly to the CRT with essentially the same results. A brightness limiting circuit 62 is also provided so that the video drive to the CRT is controlled as a function of sensed beam current.

The chrominance circuits comprise a chroma bandpass network 12 which extracts the 3.58 MHz. chroma signal from the video data and passes it to an automatic chroma control (ACC) amplifier 14. ACC amplifier 14 assures a stable color level in the system, assuming the following conditions pertain: (1) the relationship of the magnitude of the chroma signal and burst reference signal remains correct (as established at the studio during program production), and (2) system errors equally affect the burst and chroma signals. In operation, the gain of the ACC circuit 14 is controlled by a feedback signal presented on lead 17 from the burst output B of burst gate 16 so that the level of the burst signal remains essentially constant over a given range of burst signal input conditions. This in turn controls the level of the chroma signal C which is fed to variable gain chroma amplifier 18. The latter feeds the chroma signal to chroma demodulator circuit 22 which also receives an input from a controlled frequency oscillator 20. Chroma demodulator 22 in turn provides color difference signals R-Y, B-Y, and G-Y which are fed over a multiconductor line 23 to the RGB amplifier 66 for matrixing with the luminance signal from video clamp 64, to produce the red, green and blue signal drive for the CRT.

Assuming that the burst to chroma signal ratio is maintained at a correct level, chroma level remains in control and a suitable video image is produced. However, when studio transmission or reception errors upset the chroma to burst signal ratio, which is not uncommon, the operation of the ACC feedback control loop can distort the chroma level and degrade the fidelity of the video display even though the level of the chroma signal as transmitted may itself be correct.

To reduce such displayed image distortion, the system of the present invention is added to the chrominance circuits and includes a positive gate circuit 24, which receives either the R-Y signal alone or together with the B-Y signal and possibly the G-Y signal via an input line 23a, and supplies an output signal to a control circuit 26. The output signal embodies only the positive portions of the color difference input signal or signals. The control circuit 26 in turn supplies an input to a manually settable reference signal generator output circuit 28 whereupon the latter provides a gain control output signal G to the gain control input of the variable gain chroma amplifier 18. The output signal G operates to stabilize the chroma level in the output video display by reducing deviations from the preferred level selected by the viewer, notwithstanding shifts in the detected chroma level caused by the types of errors mentioned above.

A brightness tracking circuit 30 may also be provided for the purpose of maintaining a proper chroma level during periods when low brightness scenes are displayed. The circuits 24, 26, 28, and 30 are described in further detail below.

Figure 2:
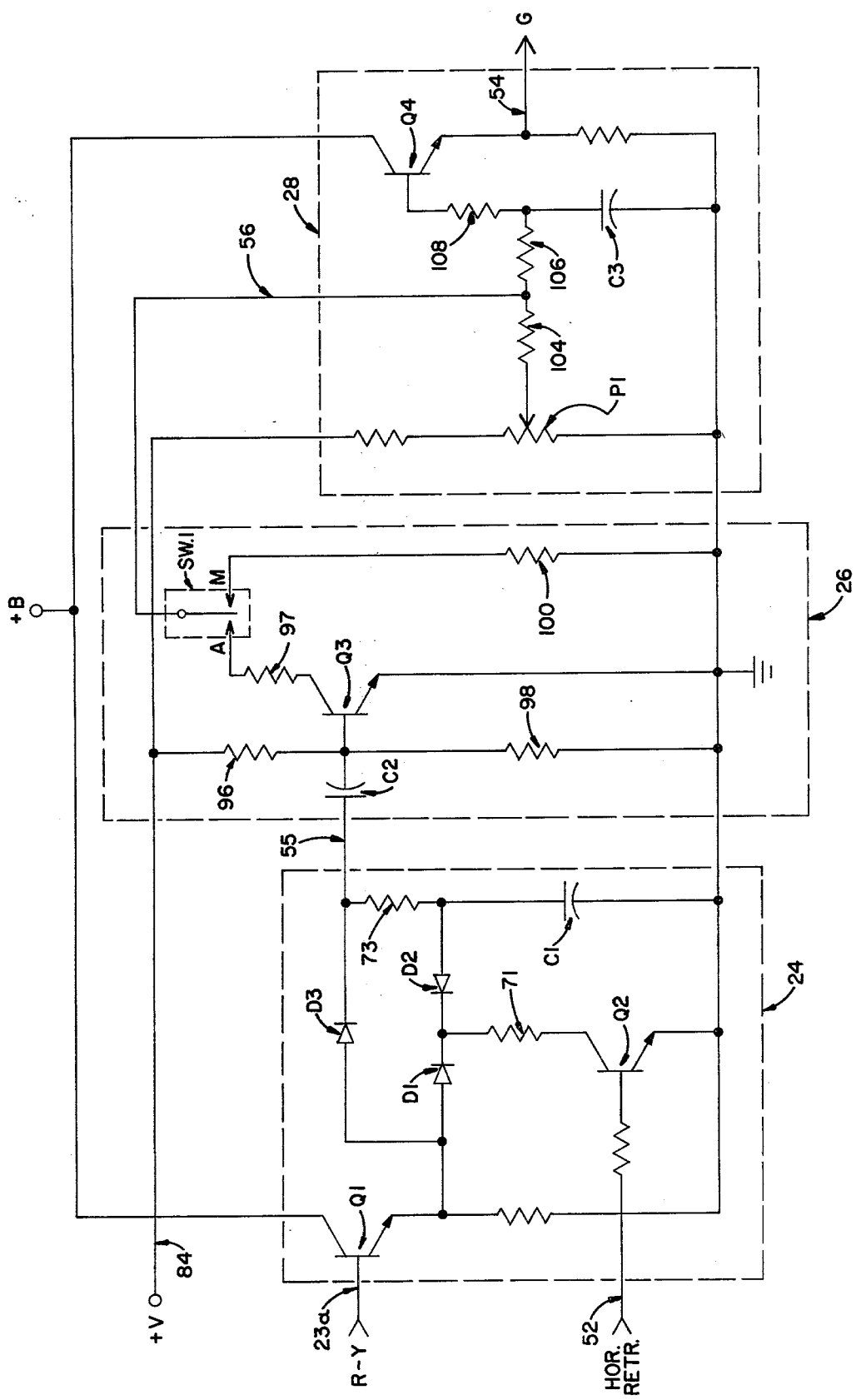
FIG. 2 is a schematic circuit diagram illustrating a first exemplary embodiment of the chroma level control system of the present invention.

A first embodiment of the chroma gain control circuits of the invention is illustrated in FIG. 2. The positive gate circuit 24 includes an input emitter follower transistor stage Q1 which receives the R-Y color difference signal from chroma demodulator 22 on input lead 23a. Gate 24 further comprises a clamping network employing a capacitor C1 and a switching transistor Q2 controlled by the horizontal retrace timing pulse received via lead 52 from high voltage transformer 48. The horizontal retrace pulse occurs after each scan line of video data so that it occurs during the chroma blanking interval. Any pulse, such as the horizontal sync pulse, would be suitable for controlling transistor Q2 so long as it occurs during the chroma blanking interval.

The output from gate 24 is fed via lead 55 to the control circuit 26 which includes a transistor Q3, capacitor C2 and biasing resistors 96 and 98. The signal produced at the collector of transistor Q3 is coupled via a switch SW1 and lead 56, to the chroma gain reference signal generator circuit 28.

The circuit 28 includes a potentiometer P1, resistors 104, 106, and 108, a capacitor C3, and an emitter follower output stage Q4 which produces the gain control signal G on output lead 54.

The circuit of FIG. 2 operates as follows when switch SW1 is set to its "auto" position A. The R-Y signal from the chroma demodulator is fed through the emitter follower Q1 to minimize loading effects on the demodulator and thereafter is presented on output line 55 by means of diode D3. The clamping network including diode D3, capacitor C1, and transistor Q2 functions to reject the negative portion of the R-Y signal so that only the +(R-Y) portion thereof appears on lead 55.

When switching transistor Q2 is turned on by a positive going horizontal retrace pulse presented on lead 52, a conduction path to ground is provided at the junction of diodes D1, D2 and diode D1 conducts so that the voltage at this junction is one diode drop below the voltage at the emitter of Q1. During normal operation a higher voltage appears at the anode of diode D2 due to the accumulated charge on capacitor C1 so that during the conduction of transistor Q2 capacitor C1 discharges to the reference voltage level, i.e. one diode drop above the voltage at the junction of diodes D1, D2. This reference voltage level is established by the no chroma voltage level at the emitter of transistor Q1 which is biased to be always conducting. The time constant of R71, C1 is short compared to that of R73, C1, permitting a quick discharge to the reference level, while the longer R73, C1 time constant during trace time enables the reference level to be maintained throughout the line. The purpose of diodes D1, D2, D3 and capacitor C1 is to establish the portion of the R-Y color difference signal that is utilized, i.e. the portion above the reference level (the reference level preferably being the zero chroma level).

During the video scan interval between horizontal retrace pulses, transistor Q2 is biased off and capacitor C1 sustains a charge level representing the R-Y zero reference level since the discharge path for C1 has been cut off. Diode D3 thus is reversed-biased for any R-Y signal having an amplitude lower than the reference level and is forward-biased for R-Y signal levels above the reference. Thus the +(R-Y) portion of the signal is fed on line 55 to the control circuit 26.

Capacitor C2 provided at the input of the circuit 26 couples the +(R-Y) signal to the base of transistor Q3. The time constant of the C2 network is made relatively short so that portions of the +(R-Y) signal having a long duty cycle, such as the signal present when a solid red background field is contained in the video data, are not fully responded to. Such signals therefore do not greatly influence the signal at the collector of Q3 and the circuit reacts as though the video signal contains a reduced red chroma level.

The Q3 collector signal, which is an inverse function of the signal appearing at the base of this transistor due to the signal inversion occasioned by this transistor, is coupled via the switch SW1 and lead 56 to the chroma gain reference signal generator circuit 28 so that output signal G produced on lead 54 changes inversely to the changes in the level of the positive R-Y signal appearing at the collector of Q3.

The reference signal generator circuit 28, including potentiometer P1 and emitter follower transistor Q4, functions to permit an operator to set the level of gain control signal G to a selected reference level in accordance with preferred chroma level in the displayed image. In addition, the level of gain control signal G is a function of level of the signal coupled into the reference signal generator via lead 56 from control circuit 26. More particularly, the viewer adjusted chroma level, as established by potentiometer P1, becomes the nominal operating point for the automatic chroma control circuit and only when the detected chroma level deviates from this setting as sensed in the average of particular portions of the color difference signals, i.e. the positive R-Y portion of the color difference signals, are such deviations reduced providing stabilization for the preferred setting.

The capacitor C3 in conjunction with resistor 106 functions to integrate the chroma control signal such that changes in the signal level are averaged over a time interval determined by the time constant of this R-C network. The time constant is chosen to be long so that gain control signal G is determined by the average red chroma content contained in several consecutive frames of video data rather than by the instantaneous level of red.

With switch SW1 in the manual (M) position the resistor 100 is substituted for the automatic chroma control circuit. The resistor 100 is selected to have the same loading effect upon potentiometer P1 as the output impedance of the transistor Q3 circuit when the transistor is conducting mid range. With the switch SW1 in the manual position the setting of potentiometer P1 solely determines the chroma gain output signal G.

Figure 4:
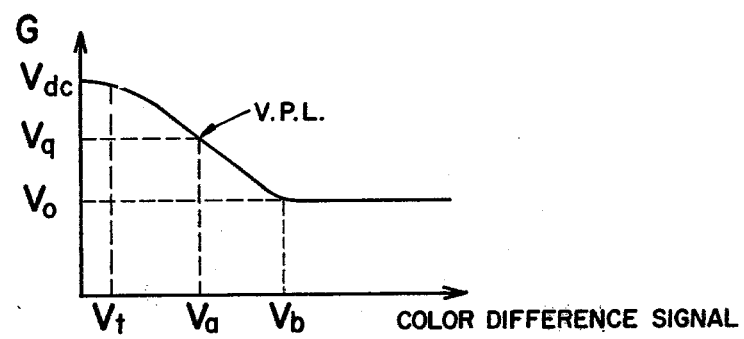
FIG. 4 is a plot of the automatic gain control signal generated by the system of the invention.

The chroma level feedback control function of the FIG. 2 circuit is illustrated in FIG. 4. FIG. 4 is a plot of output signal G amplitude versus color difference signal amplitude. It is noted that with increasing amplitude of the color difference signals being monitored by the automatic chroma level control system, the output signal G of this system decreases. Thus, at the chroma level selected by the viewer (the viewer preferred level VPL) the output signal G is at a nominal mid chroma level setting indicated as a quiescent voltage level Vq. The quiescent voltage level Vq corresponds to a monitored color difference signal amplitude Va. Operating from this quiescent condition, it is seen that when the monitored color difference signals amplitude decreases, i.e. to Vt, amplifier Q3 will conduct less providing less of a load to potentiometer P1 (or, in other words, providing a greater component of the output signal from the automatic chroma level control). At deviations of the monitored color difference signals below Vt (the low level threshold of operation of transistor Q3) transistor Q3 is not conducting and the gain control output signal G is maximum for the initial setting of the potentiometer P1.

When the amplitude of the monitored color difference signals increases, transistor Q3 conducts more fully until it becomes saturated at point Vb and presents maximum loading to potentiometer P1 and minimum signal contribution to the output signal G and for color difference signals of this or greater amplitudes the output signal G is at a minimum voltage Vo. It is noted that if the setting of P1 were to be lower, the value of Vo would be lower as would be the value of Vdc. While FIG. 4 has been described with reference to operation of the circuit shown in FIG. 2, it is also applicable to the circuit shown in FIG. 3.

It is noted that chroma gain is controlled not only as a function of chroma level variation resulting from system error, i.e. an error in video generation at the studio or errors in transmission or reception, but also as a function of variations in selected hues in the scene as determined from selected portions of the color difference signals. Because the system is thus responsive not only to errors but also to chroma level shifts in the scene (albeit the system responds only to chroma level shifts occurring for more than a few fields and yet is less sensitive to high chroma level scenes occurring for a substantial number of fields—such as a bright red background) the system preferrably has a percentage correction in the range of thirty to fifty percent. This means that the loop gain of the negative feedback control circuit of the present invention is set to correct errors, for example, by an adjustment of one half of the sensed deviation of chroma level from the preferred setting. Thus, referring to FIG. 4, a shift in the amplitude of the monitored portion of the color difference signals to the left of Va will not correct chroma gains so that chroma level returns to a Va color difference signal level (100% correction) but rather will be returned in the range of 30% to 50% of the deviation sensed.

Figure 3:
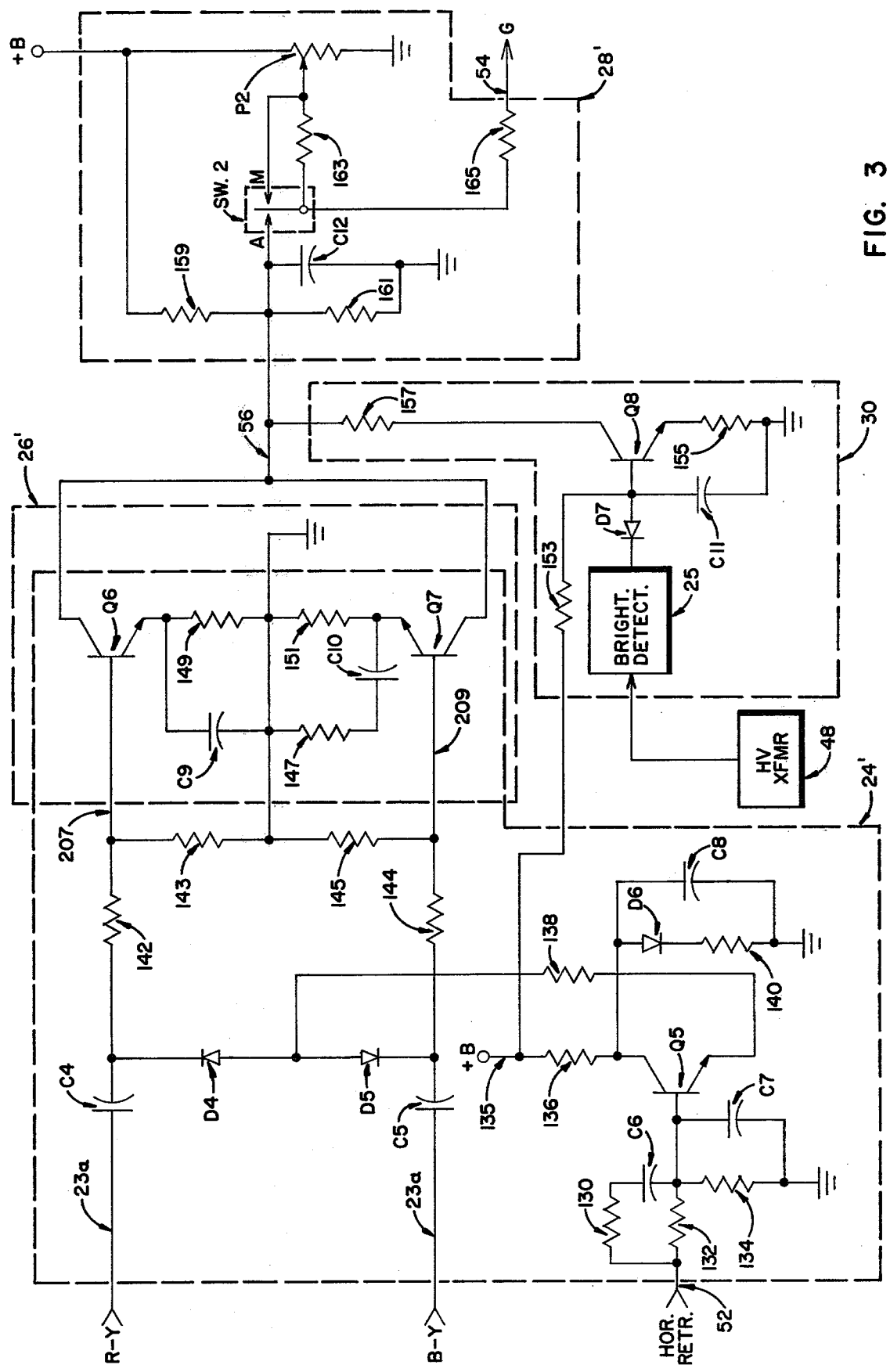
FIG. 3 is a schematic control diagram showing a second exemplary and preferred embodiment of the chroma level control system of the present invention.

A second preferred embodiment of the invention is illustrated in FIG. 3. This embodiment is preferred over the embodiment of FIG. 2 as being more comprehensive. While the embodiment of FIG. 2 is responsive to positive R-Y color difference signals, it is possible for there to be substantial chroma level error in the scenes that contain little +(R-Y) content, and accordingly the system of FIG. 3 is also responsive to positive B-Y signals. The system of FIG. 3 also proportions the response of +(R-Y) to +(B-Y) signals so that the system is more responsive to +(R-Y) deviation. Since portions of R-Y and B-Y information can be combined to form +(G-Y) information (or +(G-Y) information can be directly sensed), the system of FIG. 3 is adaptable to provide some correction for deviations in predominantly green scenes.

In addition, the system of FIG. 3 is responsive to selected brightness change such that in scenes of low level brightness, e.g. night scenes, where the color level is properly low, the automatic chroma level control system is rendered less responsive so that the chroma level is not objectionably raised.

The circuit of FIG. 3 includes a color difference signal positive gate circuit 24', a control circuit 26', a chroma gain reference signal generator circuit 28', and a brightness tracking circuit 30. The circuits 24', 26', and 28' operate in the same general fashion as the circuits 24, 26, and 28 of FIG. 2 but the FIG. 3 circuit controls chroma level as a function of the B-Y color difference signal as well as the R-Y signal. Also, it is noted that control circuit 26' is a part of gate circuit 24'. This is described more fully below, but noted here to point out that the functional block diagram of FIG. 1 is intended only as indicative of the functions performed and the actual circuits may perform more than one function.

Gate circuit 24' performs the same type of zero level reference clamping function previously described for the gate circuit 24 of FIG. 2, but instead of using the quiescent potential on input lines 23a as the source of reference voltage, the circuit 24' utilizes a separate fixed voltage source +B connected to input 135 as the source of reference potential and performs a keyed D.C. restore operation to maintain the desired reference level.

The DC reference established by the transistor Q5 and diodes D4, D5 during the keying period is such that transistors Q6, Q7 are biased just below turn on, so that signal excursions of the color difference signals above the transistors Q6, Q7 turn-on threshold will cause conduction. The diode clamp circuit only prevents transistors Q6, Q7 from being responsive to signals below the reference voltage, while permitting these transistors to respond to signal excursions above the reference voltage level. This one way clamp thus enables the circuit to respond to −(R-Y) or −(B-Y) excursions when of sufficient amplitude and duty cycle.

Capacitors C4 and C5 in series with the R-Y and B-Y signal paths, respectively, are charged to the zero signal level established during the keying period by the DC restoration circuit including switching transistor Q5 which operates in response to horizontal retrace pulses. When transistor Q5 is switched on by each horizontal retrace pulse the voltage at the capacitor C5-diode D5 junction rises to the reference level established during the keying period. The same thing occurs at the capacitor C4-diode D4 junction point.

The resulting DC reference level established by the capacitors during the charging cycle remains essentially unchanged during the interval between retrace pulses since the discharge time constant of the capacitor networks (including resistors 142, 143 and transistor Q6 for capacitor C4 and resistors 144, 145, and transistor Q7 for capacitor C5) is much greater than the horizontal period for charging the capacitors.

To initiate the keying action, a positive-going horizontal retrace pulse is coupled to line 52 through the parallel network including resistors 132 and 130 and capacitor C6 to the base of transistor Q5. Transistor Q5 is turned on during the positive portion of the retrace pulse causing the voltage at the emitter of the transistor to rise to a level slightly lower than the collector voltage. A relatively stable voltage is established at the collector of transistor Q5 by the flow of current from resistor 136 through diode D6 and resistor 140 to ground. The collector voltage is therefore the sum of forward conduction voltage drop across diode D6 plus the IR drop across resistor 140.

Capacitor C8 causes the voltage at the collector of Q5 to remain essentially constant during the keying period and allows current provided by resistor 136 to be of a relatively low level. Resistor 130 and capacitor C6 operate to compensate timing of the horizontal retrace pulse to coincide with the color difference signal blanking interval. Resistor 134 acts as a voltage divider to prevent emitter-to-base reverse bias breakdown of transistor Q5 during the negative-going trace portion of the horizontal retrace pulse. Capacitor C7 acts as an integrator to prevent switching of transistor Q5 at a rate which could produce objectionable RF interference. Resistor 138 by limiting the current to diodes D4 and D5 and in conjunction with the capacitance of these diodes, serves to limit the rate at which diodes D4 and D5 can be turned on or off, thereby eliminating possible RF interference.

The voltage level, established of Q5, when in its saturated state, at the C4-D4 and C5-D5 junction points causes the control transistors Q6 and Q7 to be biased slightly below turn-on. Appropriate divider action results from the combination of resistors 142 and 143 and resistors 144 and 145 and the input loading of respective transistors Q6 and Q7. Emitter resistors 149 and 151, together with their associated parallel-connected elements, capacitor C9, resistor 147, and capacitor C10, respectively, determine the D.C. and A.C. gain characteristics of the respective Q6 and Q7 amplifier stages.

The DC load for the transistors Q6 and Q7 is provided primarily by resistors 159 and 161 in reference generator circuit 28' and by the series combination of resistor 163 and chroma control potentiometer P2 which are connected to the circuit when switch SW2 is the the "auto" position A. The remainder of the reference generator circuit 28' includes resistor 165, which couples output signal G to the gain control input of chroma amplifier 18 (FIG. 1) via output lead 54, and capacitor C12, which functions as a signal integrator and performs the same function as capacitor C3 of the FIG. 2 circuit.

It is important to note that the averaging function provided by capacitors C12 and C3 and the resistors associated therewith in the respective embodiments of FIG. 2 and FIG. 3 is a function provided for the automatic chroma level control signal. Thus these capacitors more appropriately are a part of the control circuit 26 rather than the reference generator circuit 28, as shown. In general, the drawing of the dashed lines in FIGS. 2 and 3 is intended to be informative of the general concepts of the invention and it is to be recognized that functions such as averaging, signal inversion and frequency selectivity could be incorporated at different points in the processing circuitry of the automatic chroma level control system.

It should also be noted that throughout the description of the present invention it is assumed that a negative going control signal applied to the chroma gain amplifier 18 is required to reduce the amplitude of the demodulated color difference signals. Based upon this assumption the automatic chroma level control signal is described as being an inverse function of color difference signal change. Since it is possible for a negative going control signal applied to the chroma gain amplifier 18 to result in a positive going amplitude change in the color difference signals, wherein signal inversion within the automatic chroma level control circuit would not be required, it is intended that the inclusion of signal inversion be considered informative and not to be taken as limiting the scope of the invention.

In operation, when switch SW2 is set to manual (M), the automatic chroma level control circuit is disconnected and the output chroma gain control signal is that determined solely by the setting of potentiometer P2. When switch SW2 is in the auto (A) position the output from transistors Q6, Q7 is combined with the voltage determined by potentiometer P2. The output from transistors Q6, Q7 is realized by the application of R-Y and B-Y color difference signals to capacitors C4 and C5 respectively. The diode D4, D5 and transistor Q5 clamp circuit, as described above, has served to charge these capacitors to a reference level so that the DC voltage at the base electrodes of transistors Q6 and Q7 is set to be just below the voltage required to turn these transistors on. Thus when R-Y and B-Y amplitudes are more positive that this "zero reference level" transistors Q6 and Q7 will conduct. In this manner of biasing of transistors Q6 and Q7 these transistors act as a positive gate (block 24 in FIG. 1) to respond only to the +(R-Y) and +(B-Y) signals. It has been noted that if the amplitude excursions and duty cycle of a −(R-Y) and −(B-Y) signal is sufficiently positive, these transistors will also conduct. This will provide some response in the G-Y region, as will be noted with reference to FIG. 5. Of course, by the addition of another input capacitor, clamp diode and amplifying transistor the G-Y signal can be directly responded to in the fashion to the R-Y and B-Y signals.

The transistors Q6 and Q7 also act as the signal inverting-frequency selective amplifiers of control circuit 26 (FIG. 1). Thus the dashed line blocks 24' and 26' of FIG. 3 are shown overlapping, both blocks including the Q6, Q7 transistor amplifiers as these amplifiers fulfill both the positive gating function and the signal inverting and frequency selective amplifying functions.

Capacitors C9 and C10 in the emitter circuits of transistors Q6 and Q7 provide a similar function as previously described for the capacitor C2 of FIG. 2 whereby the circuit produces the desired degree of sensitivity to long duty cycle color difference signals so that excessively low color levels do not result from scenes of large area high saturation colors.

Figure 5:
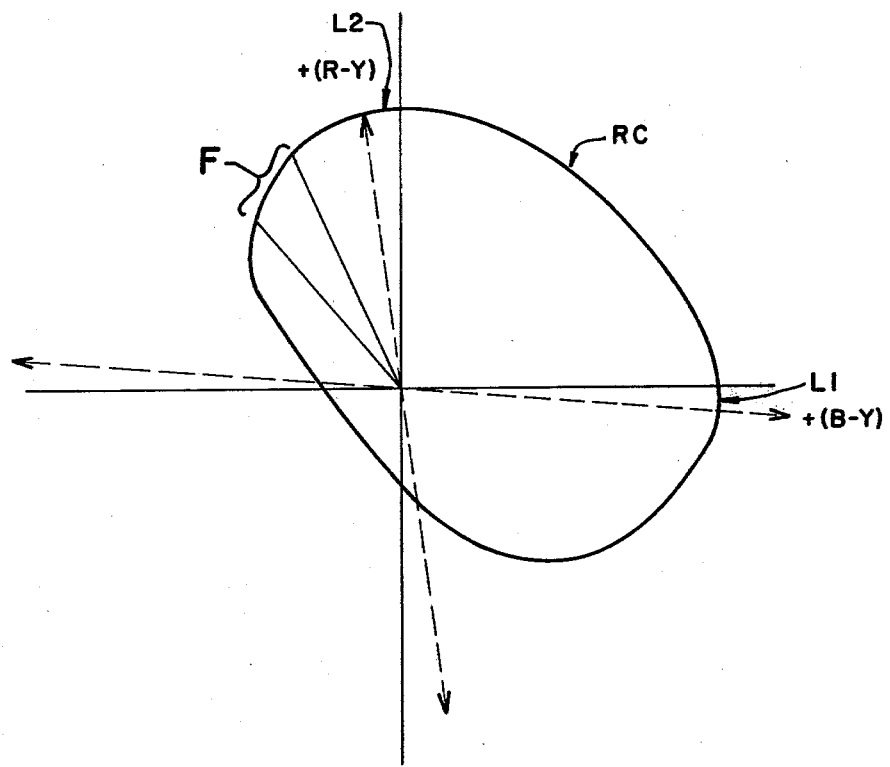
FIG. 5 is a vector phase diagram illustrating the general nature of the chroma level correction realized with the control circuit of the embodiment of FIG. 3.

FIG. 5 illustrates the general nature of the chroma gain correction applied by the circuit of FIG. 3 to the red and blue components of displayed hues. The response curve RC denotes the total loop sensitivity of the automatic chroma level correcting system of the present invention including demodulation relative gains, and shows substantially equal response in the +(R-Y) and the +(B-Y) regions with minor response in the +(G-Y) region in the third quadrant. The +(R-Y) color difference signal is in the region of the flesh tones, denoted F, and thus it is noted that the entire +(R-Y) signal is used. This is not the case with the +(B-Y) vector which extends beyond the RC curve. This shows the effect of resistors 147 and 151 in the emitter circuit of transistor Q7 which increases the degenerative feedback for this transistor thereby resulting in a proportionately lesser amount of +(B-Y) being responded to than is the case with the +(R-Y) signal.

The circuit of FIG. 3 additionally operates to control chroma gain as a function of average scene brightness. As has been previously discussed, the circuits of the invention tend to maintain an average level of chroma. However, when scenes of low relative brightness are displayed, it is desirable to compensate for the tendency of the system to attempt to raise chroma levels due to the lower color content generally associated with low brightness scenes. Accordingly, brightness tracking circuit 30 including transistor Q8 is provided. The input to the circuit is supplied by a brightness detector 25 arranged to sense beam current which may be determined from the level of current present in the ground return path of the tertiary winding of high voltage transformer 48. Detector 25 provides a signal which becomes more negative as tertiary current increases due to system loading resulting from increased brightness levels. Appropriate filtering provided elsewhere in the system (not shown) and the action of input diode D7 and capacitor C11 results in a signal related essentially to average tertiary current. The latter represents average CRT beam current and thus is representative of average scene brightness. Average brightness levels might alternatively be detected directly from video information or from power supply loading.

In operation, the base bias for transistor Q8 is provided by a resistor 153 connected to the source of supply voltage +B at lead 135. Diode D7 allows the voltage at the base of the transistor to rise one diode drop more positive that the input signal representative of scene brightness. The diode D7 and the base-emitter junction of transistor Q8 establish a desired threshold of operation. Resistor 155 provides for emitter degeneration and resistor 157 establishes the degree of correction. Thus, as brightness decreases, the signal at the cathode end of diode D7 becomes less negative and the voltage at the base of Q8 becomes more positive. This causes the transistor to draw current and thus the voltage on line 56 is reduced, lowering gain control signal G and counteracting the operation of control circuit 26' which would attempt to raise the level of G under low brightness scene conditions. As shown in FIG. 1, the low brightness control circuit 30 can be connected to the output of reference generator 28 instead of at the input of the circuit as shown in FIG. 3.

Variations and modifications in the circuits shown will occur to those skilled in the art. Thus, for example, the block diagram of FIG. 1 is intended to be functional only and the operative concepts of the invention may or may not be contained within the particular blocks shown. It is therefore intended that the foregoing examples of the invention be not taken as limiting the scope of the coverage sought but that such scope be determined solely by the appended claims.

What is claimed as new and desired to be secured by Letters Patent of the United States is:

1. In a color television receiver having chrominance processing circuits including a variable gain chroma amplifier for controlling the amplitude of demodulated R-Y, B-Y and G-Y color difference signals, a chroma level control circuit comprising:
   chroma reference means generating a chroma reference signal in accordance with a desired chroma level for the televised scene,
   gating means coupled to receive at least a selected one of said color difference signals and providing a signal output representing a preferred portion thereof, and
   control means coupled to said gating means and responsive to said signal output to develop a chroma level stabilizing signal, said control means including means to average said signal output such that the amplitude of said chroma level stabilizing signal varies as a function of the average of amplitude variations in the selected portion of said color difference signals and in a direction to stabilize chroma level,
   said control means coupling said chroma level stabilizing signal to said chroma reference means to combine with said chroma reference signal and form a chroma level control signal,
   said chroma reference means being coupled to said variable gain chroma amplifier to vary the gain thereof in accordance with said chroma level control signal.

2. The chroma level control circuit recited in claim 1 wherein said gating means is conductive during no chroma time during each horizontal line to establish a reference conducting level, said gating means including storage means to store said reference conducting level throughout each horizontal line,
   said gating means including means responsive to said reference conducting level to select the portions of the color difference signals coupled to said gating means that are more positive than said reference conducting level to form said signal output.

3. The chroma level control circuit recited in claim 2 wherein said gating means is coupled to receive said R-Y color difference signal and said signal output is representative of the positive portion thereof.

4. The chroma level control circuit recited in claim 2 wherein said gating means is coupled to receive said R-Y and B-Y color difference signals and said signal output is representative of the positive portions thereof.

5. The chroma level control circuit recited in claim 4 wherein said gating means includes first amplifier means responsive to said R-Y color difference signal and second amplifier means responsive to said B-Y color difference signal,
   each of said amplifier means being biased to a reference conducting level such that portions of said R-Y and B-Y color difference signals more positive than said reference conducting level will cause said first and second amplifier means to conduct to produce said signal output.

6. The chroma level control circuit recited in claim 5 wherein said amplifier means include impedance means controlling the relative gain of said amplifier means such that said first amplifier means has higher gain for said R-Y signal that said second amplifier means has for said B-Y signal.

7. The chroma level control circuit recited in claim 5 wherein said gating means includes switch means rendered conductive by a horizontal rate pulse generated by the television receiver durng no chroma time, said switch means generating said reference conducting level bias for said first and second amplifier means when rendered conductive, and storage means coupled to said switch means to store and apply said reference conducting level to said first and second amplifier means throughout each horizontal line.

8. The chroma level control circuit recited in claim 1 wherein said control means includes amplifier means coupled to receive said signal output, said amplifier means including time constant means responsive to the duty cycle of said signal output to reduce the response of said amplifier means in the presence of long duty cycle changes in said signal output.

9. The chroma level control circuit recited in claim 8 wherein said variable gain control amplifier requires a negative going control signal to reduce the amplitude of said demodulated color difference signals and said amplifier means provide for inversion of said signal output such that the amplitude of said chroma level stabilizing signal varies as an inverse function of the average of amplitude variations in the selected portion of said color difference signals, whereby when the detected average chroma level becomes lower than the desired chroma level established by said chroma reference signal, the gain of said variable gain control amplifier is raised by said chroma level control signal to stabilize said gain about said desired level.

10. The chroma level control circuit as recited in claim 1 wherein said chroma reference means includes manually adjustable means arranged to permit a viewer of said television receiver to set the chroma level to said desired level for the televised scene.

11. The chroma level control circuit recited in claim 1 wherein said chroma level control circuit further includes scene brightness responsive means including sensing means for sensing the average brightness level of the televised scene, and
    brightness control means coupled to said sensing means and responsive when average scene brightness level is below a predetermined level to provide a response limiting signal to said chroma reference generating means to limit changes in said chroma level control signal to that low chroma levels are not erroneously increased during low brightness scenes.

12. In a color television receiver having chrominance processing circuits including a color difference signal demodulator and a variable gain chroma amplifier coupled to said color difference signal demodulator for controlling the amplitude of demodulated R-Y, B-Y and G-Y color difference signals, a chroma level control circuit comprising:

chroma level control means coupled to said variable gain chroma amplifier to adjust the gain thereof during chroma video time to establish a desired chroma level for the televised scene, and chroma level stabilizing means coupled to said variable gain chroma amplifier and responsive to a hue-selected portion of said color difference signals during chroma video time to apply a chroma level stabilizing signal to said chroma gain amplifier to stabilize chroma level about said desired chroma level for a predetermined range of hues, said chroma level stabilizing means including selective gate means coupled to said color difference signal demodulator and responsive to a hue-selected portion of said color difference signals to develop said stabilizing signal as a function of selected hues, averaging means in circuit with said selective gate means such that said stabilizing signal varies as a function of the average amplitude variation in the selected portion of said color difference signals.

13. The chroma level control circuit recited in claim 12 wherein said chroma level control means includes manually adjustable means arranged to permit a viewer of said television receiver to set the chroma level to said desired level for the televised scene.

14. The chroma level control circuit recited in claim 12 wherein said selective gate means includes gating means rendered conductive by a horizontal rate pluse generated by said television receiver during no chroma time, said gating means generating a reference conducting level bias for said selective gate means, and storage means coupled to said gating means to store said reference conducting level throughout each horizontal line such that said selective gate is rendered conductive by portions of said color difference signals more positive than said reference conducting level.

15. The chroma level control circuit recited in claim 12 wherein said selective gate means is responsive only to the positive portion of said R-Y color difference signal, such that said chroma level stabilizing signal stabilizes the chroma level of said television receiver for average deviations in R-Y related hues in the televised scene.

16. The chroma level control circuit recited in claim 12 wherein said selective gate means is responsive to fluctuations in said R-Y and B-Y color difference signals more positive than said reference conducting level, such that said chroma level stabilizing signal stabilizes the chroma level of said television receiver for average deviations in R-Y and B-Y related hues in the televised scene.

17. The chroma level control circuit recited in claim 12 wherein said chroma level stabilizing means includes time constant means coupled to said selective gate means and responsive to the duty cycle of the selected portion of said color difference signals to reduce the response of said selective gate means in the presence of long duty cycle changes in said selected portion, such that for scenes containing predominantly high chroma levels within said predetermined range of hues, said selective gate means will be limited from unduly lowering the chroma level.

18. The chroma level control circuit recited in claim 12 wherein said chroma level control circuit further includes scene brightness responsive means including sensing means for sensing the average brightness level of the televised scene, and brightness control means coupled to said sensing means and responsive when average scene brightness is below a predetermined level to provide a response limiting signal coupled to said chroma level stabilizing signal to limit changes in chroma level during low brightness scenes.

* * * * *